United States Patent [19]

Thompson et al.

[11] Patent Number: 4,961,763
[45] Date of Patent: Oct. 9, 1990

[54] INDOOR AIR PURIFIER

[75] Inventors: T. Lewis Thompson; James V. Alexander, both of Tucson, Ariz.

[73] Assignee: Space Biospheres Venture, Oracle, Ariz.

[21] Appl. No.: 340,368

[22] Filed: Apr. 19, 1989

[51] Int. Cl.⁵ .................... B01D 29/56; B01D 53/04
[52] U.S. Cl. .................... 55/312; 55/385.1; 55/387; 55/486; 55/512; 435/266
[58] Field of Search .......... 55/97, 311, 312, 472, 55/385.2, 385.8, 482–486, 512, 73, 74, 387; 47/16–18, 60, 61; 435/262, 264, 266

[56] References Cited

U.S. PATENT DOCUMENTS

| | | |
|---|---|---|
| 2,200,581 | 5/1940 | Prüss et al. |
| 2,793,096 | 5/1957 | Pomeroy |
| 3,216,905 | 11/1965 | Baptist |
| 3,556,734 | 1/1971 | Peterson |
| 3,710,548 | 1/1973 | Coughlin ............ 55/74 X |
| 3,775,949 | 12/1973 | Wachter ............ 55/312 |
| 4,064,203 | 12/1977 | Cox ............ 55/385.2 X |
| 4,073,686 | 2/1978 | Adams |
| 4,121,916 | 10/1978 | Fricke ............ 55/472 X |
| 4,153,433 | 5/1979 | Kihlström |
| 4,161,426 | 7/1979 | Kneer ............ 55/74 X |
| 4,201,663 | 5/1980 | Rollag et al. |
| 4,225,381 | 9/1980 | Ishikawa et al. |
| 4,421,534 | 12/1983 | Walker ............ 55/73 |
| 4,512,147 | 4/1985 | Wong ............ 55/312 X |
| 4,582,514 | 4/1986 | Kneer ............ 55/73 X |
| 4,662,900 | 5/1987 | Ottengraf |
| 4,732,591 | 3/1988 | Tujisawa et al. ............ 55/385.2 X |
| 4,734,111 | 3/1988 | Hoffmann et al. |

FOREIGN PATENT DOCUMENTS

| | | |
|---|---|---|
| 318897 | 12/1918 | Fed. Rep. of Germany ........ 55/387 |
| 2643211 | 9/1976 | Fed. Rep. of Germany |
| 2605606 | 8/1977 | Fed. Rep. of Germany ........ 55/74 |
| 2809357 | 9/1979 | Fed. Rep. of Germany ........ 55/74 |
| 3003413 | 8/1981 | Fed. Rep. of Germany ........ 55/387 |
| 51-075670 | 6/1976 | Japan ........ 55/74 |
| 52-000767 | 1/1977 | Japan ........ 55/74 |
| 52-058068 | 5/1977 | Japan ........ 55/74 |
| 52-065765 | 5/1977 | Japan ........ 55/74 |
| 52-071372 | 6/1977 | Japan ........ 55/74 |
| 53-039258 | 4/1978 | Japan ........ 55/387 |
| 54-026511 | 9/1979 | Japan ........ 55/387 |
| 54-026512 | 9/1979 | Japan ........ 55/387 |
| 56-053728 | 5/1981 | Japan ........ 55/74 |
| 58-011023 | 1/1983 | Japan ........ 55/387 |
| 60-061023 | 4/1985 | Japan ........ 55/387 |
| 60-125225 | 7/1985 | Japan ........ 55/74 |
| 60-125226 | 7/1985 | Japan ........ 55/387 |
| 192523 | 11/1937 | Switzerland ........ 55/387 |

*Primary Examiner*—Robert Spitzer
*Attorney, Agent, or Firm*—Christie, Parker & Hale

[57] ABSTRACT

An indoor air purifier has a container with a layer of soil supported above a lower air plenum. Room air is drawn downwardly through the layer of soil and discharged from the plenum back into the room. Contaminant gases in the air are adsorbed in the soil and metabolized by microorganisms, producing carbon dioxide and water, and substantially reducing noxious and toxic materials in the air. The soil may be divided into two layers, and the air purifier operated in either of two modes. During normal operation, air is drawn through both layers of soil for removal of particles and destruction of contaminants by microorganisms. Alternatively, air may be drawn through only one layer of soil at a substantially higher flow rate for removing particulate materials. Plants may be grown in the upper portion of the soil to aid in air purification and to provide an attractive room decor.

42 Claims, 3 Drawing Sheets

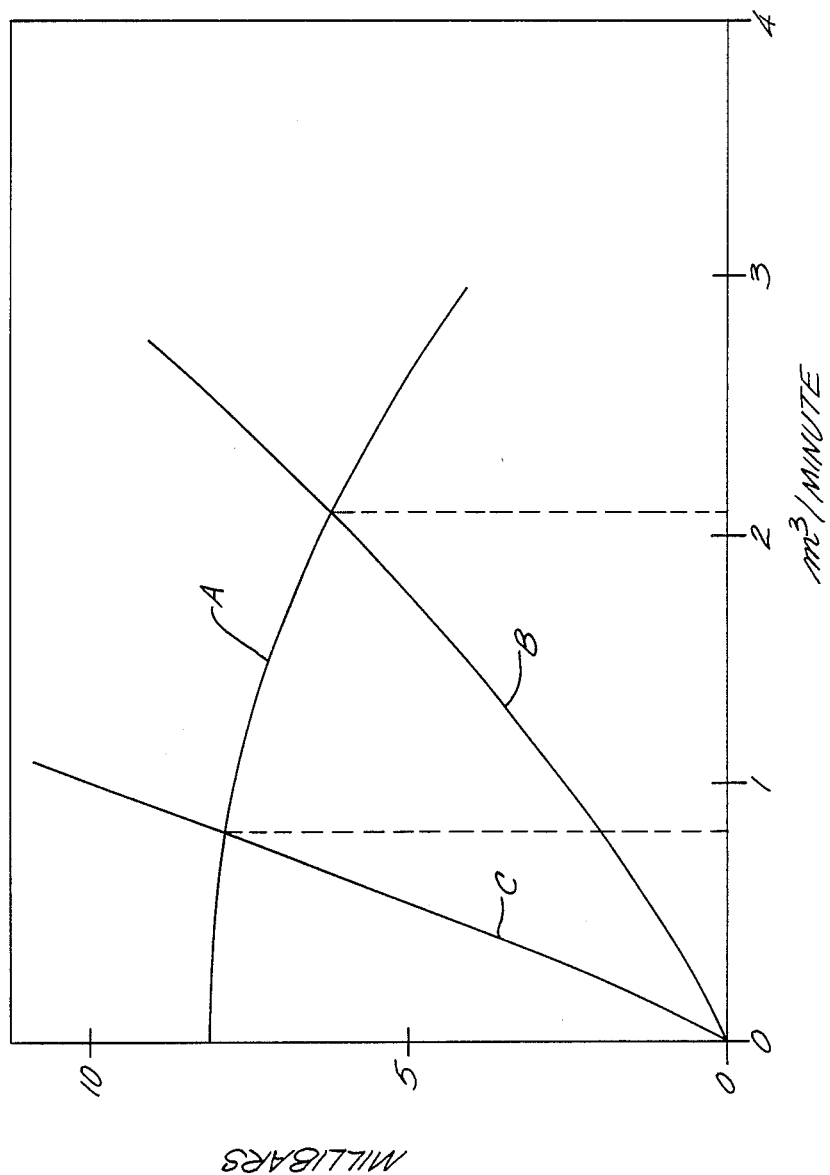

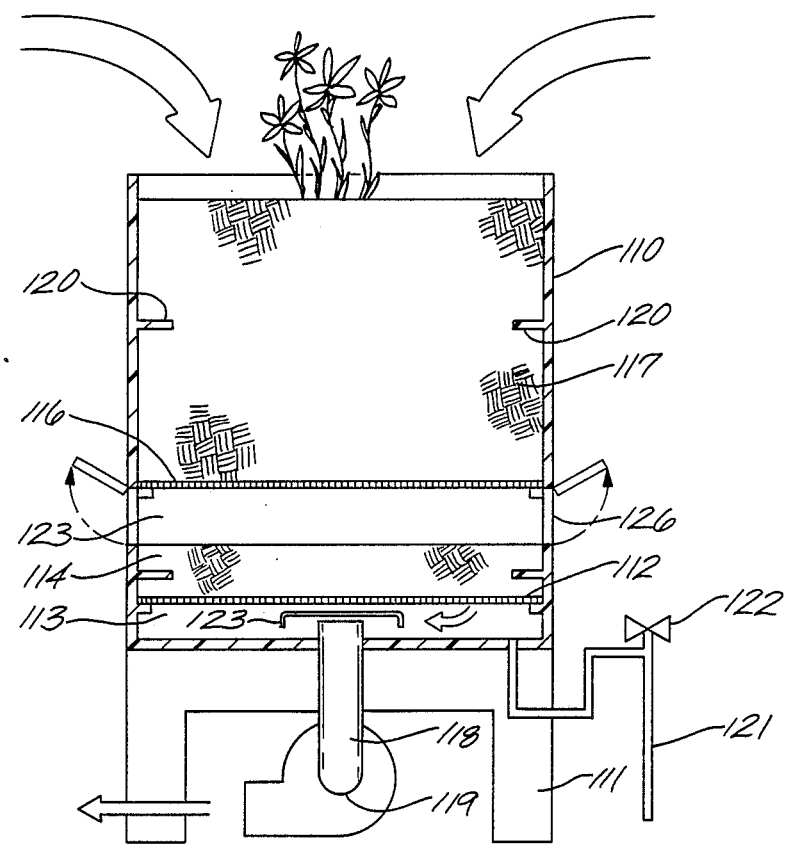

INDOOR AIR PURIFIER

FIELD OF THE INVENTION

This invention relates to an indoor air purifier using a soil bed reactor through which air is drawn for removal of particulates and oxidation of noxious gases by aerobic microorganisms in the soil.

BACKGROUND OF THE INVENTION

The indoor environment is often contaminated with a variety of noxious and toxic gases including carbon monoxide, methane, sulfur dioxide, hydrogen sulfide, $NO_x$, and a broad variety of organic vapors. Some of these are widely prevalent in the environment, particularly in urban areas, and others tend to be pronounced in homes, offices, or other confined spaces due to activities within those spaces.

Noxious or toxic materials may be produced from tobacco smoking, cooking, open fireplaces, faulty appliances, or a variety of other normal activities. Some of these are merely unpleasant because of odors; others, such as products of smoking or cooking, may accumulate and soil surfaces; while others, such as carbon monoxide, may be dangerous. It has been found, for example, that a high proportion of homes have unsuspected carbon monoxide concentrations which contribute to vague disorders such as lassitude and headaches at concentrations far below levels that produce overt symptoms of toxicity.

Unwanted particles are also commonly found in the environment. Tobacco smoking produces particles as well as gases. Organic aerosols, dust particles, pollen and minute organisms may also float in the air. In some dusty areas such particles can be hazardous due to the chemical nature of the particles, or just due to the fine particle size. Environmental standards have been promulgated for particles smaller than ten micrometers since these penetrate much deeper into the lungs than coarser particles.

Clearly, it is desirable to reduce the concentrations of such noxious and toxic materials in the indoor environment.

A variety of devices have been marketed over the years to assist in this regard. Negative ion generators are regarded by some as effective. However, they are effective largely for particles, and do not provide broad spectrum removal of many gases. Room air fresheners do very little but mask the problem with more acceptable vapors. Activated charcoal filters may be used, but they are fairly costly and eventually lose their activity as the activated sites on the charcoal are used up. It is also difficult to assess whether such filters remain effective, and they may be prematurely discarded or kept in service long after their useful life.

It is, therefore, desirable to provide an air purifier for use indoors for reducing the concentrations of particulates, and noxious and toxic gases in the air. It is desirable that this apparatus operate effectively for long periods without being exhausted or require costly replacements. It is desirable that it be effective with respect to a broad variety of noxious and toxic materials. It is desirable that it be simple and require low maintenance. It is also highly desirable that it be attractive since it becomes a permanent fixture in the indoor environment.

BRIEF SUMMARY OF THE INVENTION

There is, therefore, provided in practice of this invention according to a presently preferred embodiment, an indoor air purifier in the form of an open top container with a layer of soil suitable for supporting growth of aerobic microorganisms. Means are provided for drawing air from a room through the open top of the container, downwardly through the layer of soil into an air plenum below the layer of soil, and discharging the air from the plenum back into the room. In such an air purifier, particulates in the air are caught in the layer of soil and removed. Many gases are adsorbed on soil particles or are removed by contact with soil moisture. Aerobic microorganisms in the soil oxidize a broad spectrum of vapors and remove them from the air, releasing only carbon dioxide and water. Preferably the layer of soil is in the form of a relatively thinner layer of soil and a relatively thicker layer of soil with an air space between them. Means may then be provided for passing air through both layers of soil for removing particles and gases, or alternatively through only the thinner layer of soil for rapid removal of particulates.

Such an air purifier is kept attractive since the layer of soil is also suitable for supporting growth of plants selected by the homeowner or office worker.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 2 is a graph illustrating flow rate of air as a function of pressure; and

FIG. 3 illustrates in semi-schematic cross section another embodiment of indoor air purifier.

DETAILED DESCRIPTION

Figure 1:
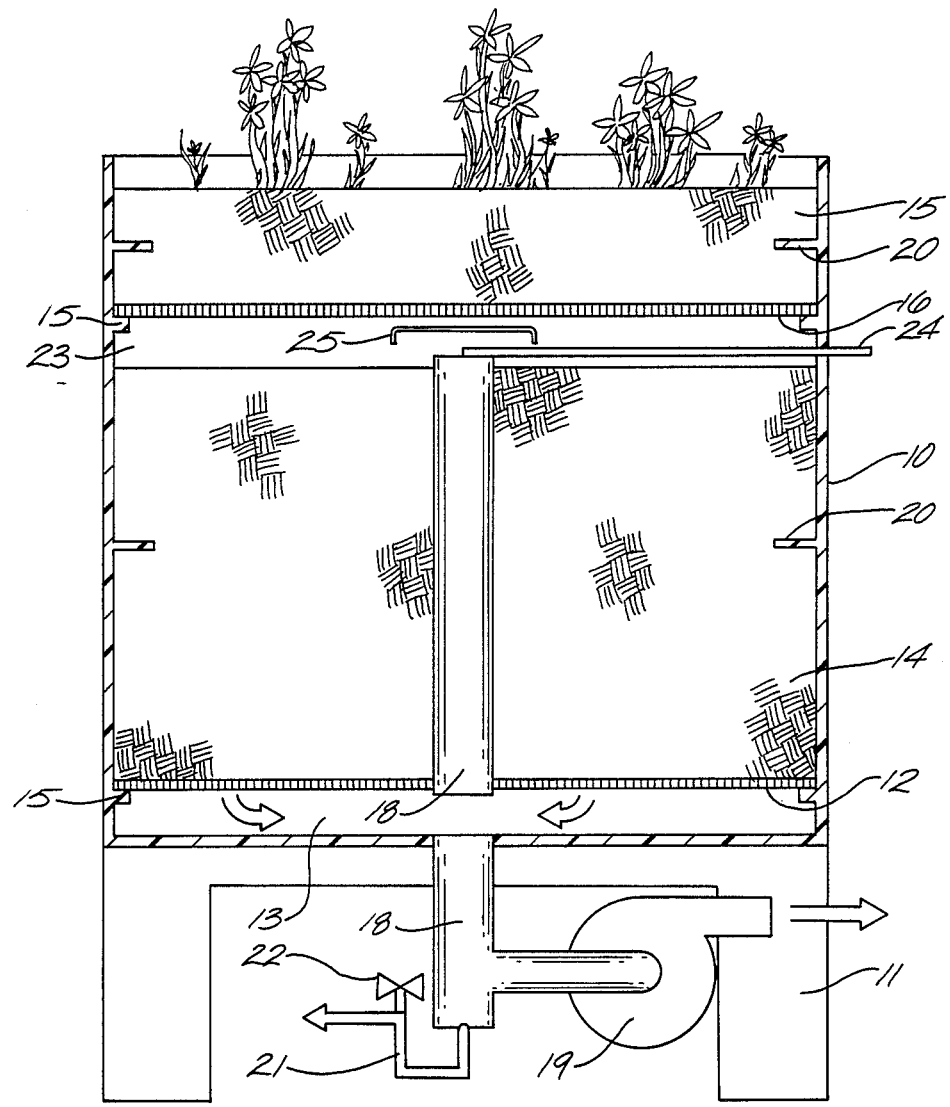
FIG. 1 illustrates a simple embodiment of soil bed reactor indoor air purifier in semi-schematic vertical cross section.

In an exemplary embodiment, an indoor air purifier has an open top, largely impermeable container 10 sitting on a small floor stand 11. The container may, for example, be a glass fiber reinforced plastic box, cylinder, or the like, which is waterproof and which may be colored or decorated on the exterior in a manner suitable for permanent display in a home, office, or the like. A ceramic container is also suitable. Preferably, the horizontal cross section of the container is in the range of from 0.25 to 1.5 square meters. An exemplary embodiment is in the form of a rectangular container one and one-half feet by two feet (0.45 by 0.6 meter).

A lower screen 12 is positioned above the bottom of the container to define a five to ten centimeter high air plenum 13 at the bottom. The screen may be in the form of ordinary eighteen mesh glass fiber or plastic window screen material supported on four mesh plastic hardware cloth, which is in turn supported on a rigid plastic lattice. The screen may be supported above the bottom of the container by a spider, a shoulder 15 inside the container, or the like.

A lower layer of soil 14 is placed on top of the lower screen. Typical depth of the layer of soil is thirty to fifty centimeters. About five to ten centimeters above the top of the lower layer of soil there is an upper screen 16 similar to the lower screen 12. An upper layer of soil 17 is provided on the upper screen. Preferable thickness of the upper layer of soil is in the range of from five to fifteen centimeters.

As used herein, "soil" means a porous hydrophilic medium which supports growth of aerobic microorganism populations which oxidize airborne organic contaminants. It may comprise soil indigenous to the area which may be augmented with organic additives, peat moss, sand and clay mixtures, small ceramic or plastic particles or rings, commercially available potting soil, or the like.

So-called potting soil is preferred since it is hydrophilic, rich in organic nutrients, stable, permeable, readily available, and inexpensive. Such a typical potting soil includes sand, a small amount of clay, other mineral grains, and organic particles or fibers, and may include adjutants such as bits of plastic foam for enhancing permeability, and conventional chemical fertilizers. The soil used may also include additions of alkaline materials for neutralizing acid gases such as $SO_2$ and $NO_x$.

Preferably the total thickness of the layer of soil, i.e., the combined thicknesses of the upper and lower layers, is in the range of from 40 to 150 centimeters. A layer thinner than 40 centimeters may have insufficient residence time of air passing through the soil for adsorption on soil particles so that microorganisms may oxidize a substantial proportion of the noxious gases in the air. Layers having a thickness of more than 1.5 meters may have such low permeability that reasonable air volumes cannot be drawn through the layer of soil with a reasonable pressure drop. In an indoor air purifier, it is preferred that the total thickness of the layer of soil be no more than a meter. Otherwise, the unit may be too bulky to be attractive, and there is little advantage to a thicker bed.

Preferably the layer of soil has a thickness and permeability which permits air to be drawn through the soil with an apparent residence time of at least five seconds.

It is desirable for a number of reasons to grow plants in the soil bed reactor, not the least of which is that plants may be selected for their attractive appearance in the home or office environment. The plants help maintain the porosity of the soil and plant debris maintains soil nutrients which help support growth of microorganisms. It is also desirable that the plants grown in the upper layer of soil be chosen so that they have some value in cleaning the air. Foliage plants for removing indoor air pollutants include the common spider plant (Chlorophytum elatum var. vittatum) and golden pothos (Scindapsus aureus).

A duct 18 extends through the bottom of the container to provide air communication between the air plenum 13 and a conventional blower 19. Thus, when the blower is on, room air is drawn downwardly through the open top of the container, through the two layers of soil and their supporting screens, and into the air plenum. The blower discharges clean air from the plenum back into the room where it commingles with the other air in the room. Passing air through both layers of soil is the usual mode of operation.

A wall wiper 20 in form of an inwardly directed ledge is provided in each layer of soil a reasonable distance below the surface. It is found that drying and shrinkage of soil may cause the edge of the soil bed to pull away from the wall of the container, thereby leaving a channel for air flow to bypass a portion of the bed. The wall wiper interrupts any such channel around the periphery of the layer of soil and redirects the flow through the principal portion of the layer. A thin baffle four or five centimeters wide around the inside perimeter of the container is sufficient to avoid this potential problem with some soils. A flange may also be provided around the duct through the layer of soil for similar reasons.

As the air flows through the soil pores, the surfaces of the soil particles adsorb contaminants from the air. These adsorbed contaminants are then quickly oxidized by microorganisms in the soil or by surface catalysis. The oxidation continually renews the adsorption capacity of the soil. Gaseous contaminants adsorb more readily to the soil surfaces than do nitrogen, oxygen and carbon dioxide, and thus are held to the soil surfaces as the air stream flows downwardly through the soil. This places the contaminants in the milieu where microorganisms can employ the contaminants as nutrition and energy sources, releasing carbon dioxide and water. Some organic vapors are apparently captured directly by microorganisms for their metabolism. Further, the bed of soil removes particulates from the air stream, including submicron aerosols, cigarette smoke, and the like.

It is important to keep the layer of soil in the soil bed reactor of the purifier moist. Water is required by the microorganisms and adsorption of some vapors, particularly acid gases and some water soluble species such as formaldehyde, is enhanced by the presence of moisture. Further, if the layer of soil dries unduly, shrinkage cracks may form which bypass air flow through the bed and promote channeling which reduces the effectiveness of the purifier. Excessive moisture content is not desirable, however, since the moisture competes with organic gas molecules for adsorption sites in the soil and the permeability of the soil may be unduly reduced if the soil is saturated with water.

Water added to the soil to support growth of the plants maintains an appropriate moisture content for effective adsorption of gases, filtering of particulates, and sustained growth of microorganisms.

If too much water is added to the soil, it drains into the air plenum at the bottom. A drain 21 having a valve 22 may be used for draining surplus water from the air plenum. It may be desirable to recycle a portion of the water to the soil in the purifier so that excessive nutrients are not leached out. Not all of the water should be recycled so that microorganism waste products do not build up.

The microorganisms that are present in the soil in the air purifier may be those indigenous to the soil introduced or may be specially inoculated into the soil. Most soils collected at random contain many species of microorganisms which are involved in practice of this invention. No particular types of microorganisms are required for practice of this invention, with the possible exception of thiobacillus for oxidation of hydrogen sulfide, mercaptans and other sulfurous materials. It is common to find many families and species of microorganisms in the soil, including pseudomonas, bacillus, nocardia, flavobacterium, micrococcus, rhizobium, trichoderma, and various other bacteria, yeasts, fungi, and the like. It is actually desirable to have a variety of organisms in the soil so that a variety of contaminant gases may be effectively metabolized and various species may proliferate as concentrations of various contaminants vary with time.

It is desirable to inoculate the soil with a variety of such microorganisms since indigenous soil added to the reactor may be deficient in microorganisms. Without inoculation it may take some time to build up a sufficient population of microorganisms for thorough removal of contaminants from the air. Inoculation is particularly important with some commercial potting mixes which have been pasteurized for removal of pathological organisms. Without inoculation a substantial time may ensue before effective contaminant removal is obtained.

The duct 18 also extends upwardly through the lower layer of soil to an air space 23 between the upper screen 16 and the top of the lower layer of soil. The air space may be five to ten centimeters high. At the top of the duct in the air space there is a valve 24 which in the simplest embodiment is simply a slide damper that fits over the top of the duct and closes the duct when advanced, or leaves it open when retracted. A simple butterfly valve, or the like, may also be used. A baffle 25 over the top of the duct prevents debris or water from entering the duct. An elbow at the top of the duct can serve the same function.

During normal operation of the soil bed reactor air purifier, the valve at the top of the duct is closed and air is drawn downwardly through both layers of soil and discharged into the room. Microorganisms in the soil traversed by the air effectively remove contaminants from the air.

In the event of a high concentration of particulates or aerosols, such as for example cigarette smoke in the room, the bypass valve 24 may be opened, thereby permitting the blower to withdraw air from the air space between the layers of soil. When the valve is open, air is drawn through the upper thin layer of soil and very little if any air is drawn through the thicker layer of soil. This significantly increases the flow rate of air through the layer of soil for rapid removal of the particulates by the thinner "filter" layer.

Highly effective particulate removal may be obtained. For example, it has been calculated that for an "average" sized room having an internal volume of 32.5 cubic meters, 98% of particulate matter, such as cigarette smoke, is removed from the room air in an hour with a flow rate of 2.12 cubic meters per minute through the layer of soil. This flow rate can be achieved through a ten centimeter layer of potting soil with a pressure drop of about six millibars. Such a flow rate is provided by a blower driven by a forty watt motor (approximately 1/20 horsepower).

The permeability of soil varies considerably, depending on the type of soil used. The pressure drop for a given flow rate through a typical potting soil may be about one and one-half orders of magnitude greater than the pressure drop through a comparable thickness of mulched peat moss at the same flow rate. The soil bed reactor in the air purifier has somewhat mixed permeability requirements. It is desirable that at least the upper portion of the soil in the air purifier provide a sufficient density for secure support of the plant roots. A less dense soil may be used in the lower section to reduce blower power requirements. Thus for example, a lower portion of the soil may be mulched peat moss and an upper layer of the soil may be more conventional potting soil.

It may also be desirable to employ two different types of soil in the air purifier for enhancing the range of contaminants removed by the soil. There is some indication that acid soils are better for carbon monoxide removal than alkaline soils. On the other hand, alkaline soils are needed for removing acid gas such as sulfur dioxide or $NO_x$. Thus, separate layers of acid and alkaline soils may be employed. Generally speaking, the water used for irrigating the soil bed reactor tends to be alkaline. Thus, maintaining an acid soil in a portion of the air purifier may require occasional reintroduction of acid or replacement of a portion of the soil. It is by no means certain that acid soils are better for carbon monoxide removal and the more typical alkaline conditions in the soil may be maintained throughout the thickness of the bed.

FIG. 2 illustrates exemplary flow rates for a specific embodiment of air purifier. Curve A is a so-called blower curve indicating the air flow rate in cubic meters per minute which can be provided by a blower at a given pressure drop in millibars. Such blower curves are commonly provided by blower manufacturers. The curve illustrated is for a blower driven by a 40 watt motor.

Curve B indicates the pressure drop through a ten centimeter thick layer of an exemplary potting soil as a function of the air flow rate. The intersection of such a curve with the blower curve indicates the rate of flow and pressure drop for an indoor air purifier using a soil bed reactor with such potting soil. As suggested by the example given above, the bed flow rate curve intersects the blower curve at an air flow rate of 2.12 cubic meters per minute. This corresponds to the flow through the thinner layer of soil when the duct valve 24 is open.

Curve C illustrates the pressure drop as a function of flow rate through 45 centimeters total thickness of typical potting soil. This is about typical for flow through the air purifier when the duct valve is closed and air is withdrawn from the lower plenum. This curve intersects the blower curve at a flow rate of about 0.82 cubic meters per minute. This was calculated for an air purifier having a horizontal area of about 0.28 square meters. Thus the flow rate is about three cubic meters per minute per square meter of soil bed area.

In an exemplary embodiment, the apparent residence time of air in the soil is in the order of ten seconds (this is referred to as apparent residence time since the porosity of the soil is not taken into account, and the true residence time is less, depending on the soil porosity). It is estimated that the minimum apparent residence time for effective removal of contaminants by microorganisms is in the order of five seconds.

There is no clearly defined upper limit on the residence time of air in the soil. However, a few limiting parameters are apparent. The residence time must be short enough that aerobic conditions are maintained in the soil for metabolism of contaminants by aerobic organisms. In an air purifier used indoors, there are practical limits to the room area that can be devoted to the air purifier. Under those circumstances a long residence time means a relatively low effective rate of removal of contaminants from the air in the room since the total volume of air conveyed through the soil bed is low. It is desirable to exchange the volume of air in the room through the air purifier in the order of twice per hour for more or less normal levels of contaminants in the room.

It is also desirable to have a relatively long residence time, i.e., a relatively low flow rate for minimizing drying of the soil. Thus, in an exemplary embodiment with a flow rate of three cubic meters of air flow per minute per meter of bed area, about 14 to 15 liters of water were required per square meter of bed area per day. This application of water for maintaining a moist soil bed was in an arid region with low relative humidity. The amount of water needed is easily estimated from the flow rate and the observation that air withdrawn from the lower part of the bed is substantially saturated with water vapor. It might be noted that there is no undue drying in the upper portion of the bed where the air enters since the capillary flow rate of water in the bed is sufficient to compensate for evaporation. There is, however, a tendency to build up deposits of alkaline salts at the upper portion of the bed and it is desirable to occasionally remove and replace such soil.

Occasional soil replacement in the air purifier is desirable anyway since the microorganisms also tend to decompose organic matter in the soil and cause packing of mineral grains, which reduces soil permeability. Heavy particulate loads removed from the air by the filtering action of the soil also tend to reduce soil porosity to the extent such particulates are not organic materials metabolized by microorganisms. Such changes may unduly increase pressure drop through the soil bed reactor.

Various contaminants in the air are removed with varying efficiency. As indicated previously, acid gases are readily removed in alkaline soils. Carbon monoxide is also readily removed, which may involve a combination of microbial action and catalytic oxidation. A variety of organic materials are readily removed. Methane is somewhat refractory and is removed slowly.

It should also be noted that removal rates tend to be good when the air composition is fairly uniform over substantial periods of time. This promotes the maintenance of a suitable flora of microorganisms which effectively metabolize the contaminants uniformly present in the air. There may be times when unusual concentrations of specific contaminants in the air are not rapidly removed since the organisms in the soil do not have a substantial ability to metabolize such materials.

For example, in a space where formaldehyde may be uniformly present due to out-gasing of foamed insulation, a culture of microorganisms may be sustained in the soil bed reactor which is effective for removing such material. On the other hand, if formaldehyde is introduced into a room where it is not normally present, there may be appreciably less effective removal. Some of the formaldehyde may be adsorbed on moist soil particles and some of the microorganisms may attack the formaldehyde, but the effective rate of removal may be low until a suitable culture of microorganisms has proliferated. This is an advantage of a soil bed reactor air purifier since the microorganisms can evolve to provide a culture which is effective for the contaminants which naturally occur in the indoor environment in which the device is used.

FIG. 3 illustrates another embodiment of indoor air purifier constructed according to principles of this invention. Since many of the parts of this embodiment are similar to the embodiment hereinabove described and illustrated in FIG. 1, similar parts are identified with similar reference numerals with the addition of 100. Thus, for example, in the embodiment of FIG. 1, the soil bed is in a container 10, and the similar container in FIG. 3 is identified by the reference numerals 110.

In this embodiment, the upper layer of soil 117 is relatively thick, for example, forty to fifty centimeters, and the lower layer of soil 114 is relatively thin, for example, ten to fifteen centimeters. The duct 118 leading to the blower 119 extends only into the lower plenum 113.

Instead of a valve, one or more covered vents 126 are provided through the wall of the container into the air space 123 between the two layers of soil. During normal operation, the covers on the vents are closed, and the air is drawn through both layers of soil into the lower plenum 113 for discharge by the blower 119 as hereinabove described. In the event it is desired to remove particulates rapidly, the vents may be opened, thereby bypassing the upper layer of soil and drawing room air directly through the lower, relatively thinner layer of soil. Other than that, this air purifier is used in much the same way as the purifier hereinabove described and illustrated in FIG. 1.

An embodiment with a relatively thicker layer of soil at the top and a relatively thinner lower layer may be desirable when the plants grown in the air purifier require relative deep roots. The thicker layer is also less susceptible to drying than the thinner layer when at the upper portion of the purifier, and could prevent possible plant dehydration when the unit must be used frequently as a particulate filter.

If desired, moisture sensors may be included with the air purifier for assuring that the soil bed remains moist. Either electronic or chemical moisture sensors may be used. For example, soil conductivity may be measured and used to indicate water content. If desired, instead of just measuring soil moisture, such electronic sensing may be employed for making controlled additions of water to the bed of soil in the air purifier. Drip irrigation may also be used.

As another example, a porous stone impregnated with cobalt chloride could provide a color change in the event the layer of soil became too dry. It is preferred to use a sensor that indicates soil moisture somewhat earlier than a "too dry" condition.

Other color indicators may also be included for indicating soil condition. For example, a porous stone impregnated with phenolphthalein may be provided at the top of the layer of soil to indicate the acidity or alkalinity of the soil. Such indicators may be used for visually guiding the user with respect to addition of neutralizing agents, nutrients, or the like.

Although limited embodiments of indoor air purifier had been described and illustrated herein, many modifications and variations will be apparent to those skilled in the art. Thus, for example, in the event there is no perceived need to occasionally filter particulates from the air, a single layer of soil without an intermediate air space may be provided in the container. In such an embodiment, two different types of soil may still be used to provide a firm foundation for plant roots near the upper surface and a higher porosity soil near the lower portion of the layer for decreased pressure drop.

Also, if desired, one or more layers of soil may be placed in trays which fit snugly within the container for minimizing the bypassing of air. This permits the trays of soil to be removed as desired for replacement, cultivation, chemical treatment, or the like. Such an arrangement may be desirable, for example, where the purifier is used in an interior room where plants growing in the upper layer of soil may not thrive. Upper level trays of soil with growing plants may be rotated between interior and exterior locations for maintaining healthy plant growth.

The indoor air purifier may operate continuously, or if desired, a time clock may be used for operating the purifier periodically. A photosensitive sensor may be used for operating the purifier during the day or when lights are on in the room.

A variety of other physical arrangements of the purifier may also be employed. For example, a blower may be mounted on one face of the container and draw air from a side of the lower plenum, so that a stand that elevates the container is not required. In such an embodiment, ducts may be provided between the blower and both the lower plenum and the intermediate air space. Then a simple diverter plate may switch the suction between the two ducts for normal operation with air drawn through both layers of soil, or for operation in the high flow rate particulate-filtering mode.

Instead of having an open air plenum at the bottom of the container or a fully open air space in the middle, one may provide a buried grid of perforated pipes, or the like, through which air is withdrawn. It is desirable to bury such pipes in relatively coarse gravel, or the like, to minimize possible plugging.

These and other modifications and variations will be apparent to those skilled in the art. Thus, it is to be understood that, within the scope of the appended claims, the invention may be practiced otherwise than as specifically described.

What is claimed is:

1. A soil bed reactor room air purifier comprising:
   a lower layer of soil containing aerobic microorganisms;
   an upper layer of soil containing aerobic microorganisms above the lower layer of soil;
   an air space between the upper and lower layers of soil;
   means for passing air from a room through both layers of soil and discharging the air into the room in a first mode of operation;
   means for passing air from a room though only one of the layers of soil and discharging the air into the room in a second mode of operation; and
   means for switching between the first and second modes of operation.

2. An air purifier as recited in claim 1 wherein one of the layers of soil has a thickness in the range of from 5 to 15 centimeters.

3. An air purifier as recited in claim 2 wherein the total thickness of the two layers of soil is at least 40 centimeters.

4. An air purifier as recited in claim 1 wherein the total thickness of the two layers of soil is in the range of from 40 to 150 centimeters.

5. An air purifier as recited in claim 1 further comprising plants growing in the upper layer of soil.

6. An air purifier as recited in claim 1 wherein the upper layer of soil is thinner than the lower layer of soil.

7. An air purifier as recited in claim 1 wherein the upper layer of soil is thicker than the lower layer of soil.

8. An air purifier as recited in claim 1 wherein the upper layer of soil has a different permeability than the lower layer of soil.

9. An air purifier as recited in claim 1 wherein the means for passing air comprises:
   an air plenum below the lower layer of soil; means for withdrawing air from the plenum;
   a bypass duct communicating between the plenum and the air space; and
   valve means for selectively permitting or preventing air flow through the bypass duct.

10. An air purifier as recited in claim 1 wherein the means for passing air comprises:
    an air plenum below the lower layer of soil;
    means for withdrawing air from the plenum; and
    means for selectively admitting air directly into the air space and bypassing the upper layer of soil.

11. An air purifier as recited in claim 1 further comprising means for withdrawing liquid from below the lower layer of soil.

12. An air purifier as recited in claim 1 wherein the means for passing air through only one of the layers of soil comprises valve means for selective communication of air between the air space and the outside of the air purifier.

13. An air purifier as recited in claim 1 wherein the means for passing air through only one of the layers of soil comprises valve means for selective removal of air from the air space.

14. An indoor air purifier for removing oxidizable gases and particulates from room air comprising:
    an upper layer of soil capable of supporting growth of aerobic microorganisms;
    a lower layer of soil below the upper layer of soil and capable of supporting growth of aerobic microorganisms;
    means for recycling room air through both layers of soil in a first mode of operation;
    means for recycling room air through only one of the layers of soil in a second mode of operation; and
    means for switching between the first and second modes of operation.

15. An air purifier as recited in claim 14 wherein one of the layers of soil has a thickness in the range of from 5 to 15 centimeters.

16. An air purifier as recited in claim 14 wherein the total thickness of the two layers of soil is at least 40 centimeters.

17. An air purifier as recited in claim 14 wherein the upper layer of soil has a different permeability than the lower layer of soil.

18. An air purifier as recited in claim 14 wherein the means for passing air comprises:
    an air plenum below the lower layer of soil;
    means for withdrawing air from the plenum;
    an air space between the upper and lower layers of soil;
    a bypass duct communicating between the plenum and the air space; and
    valve means for selectively permitting or preventing air flow through the bypass duct.

19. An air purifier as recited in claim 14 wherein the means for passing air comprises:
    an air plenum below the lower layer of soil;
    means for withdrawing air from the plenum;
    an air space between the upper and lower layers of soil; and
    means for selectively admitting air directly into the air space and bypassing the upper layer of soil.

20. An indoor air purifier comprising:
    an open top container;
    a relatively thinner upper layer of soil in the container suitable for supporting growth of aerobic microorganisms;
    a relatively thicker lower layer of soil in the container suitable for supporting growth of aerobic microorganisms;
    means for selectively withdrawing air from between the upper and lower layers of soil;

an air plenum below the lower layer of soil; and
means for drawing air from a room through the open top of the container downwardly through the layers of soil into the plenum, and discharging the air from the plenum back into the room.

21. An indoor air purifier as recited in claim 20 wherein the top surface area of the upper layer of soil is in the range of from 0.25 to 1.5 square meters.

22. An indoor air purifier as recited in claim 20 wherein the thickness of the layer of soil is in the range of from 40 to 100 centimeters.

23. An indoor air purifier as recited in claim 20 wherein the air drawing means draws air through the layer of soil at a sufficient rate that the apparent residence time of the air in the soil is more than about five seconds.

24. An indoor air purifier comprising:
an open top container;
a relatively thicker upper layer of soil in the container suitable for supporting growth of aerobic microorganisms;
a relatively thinner lower layer of soil in the container suitable for supporting growth of aerobic microorganisms;
means for selectively introducing air between the upper and lower layers of soil without passing through the upper layer of soil;
an air plenum below the lower layer of soil; and
means for drawing air from a room through the open top of the container downwardly through the layers of soil into the plenum, and discharging the air from the plenum back into the room.

25. An indoor air purifier comprising:
an open top container;
a relatively thicker upper layer of soil in the container suitable for supporting growth of aerobic microorganisms;
a relatively thinner lower layer of soil in the container suitable for supporting growth of aerobic microorganisms;
an air plenum below the lower layer of soil;
means for drawing air from a room through the open top of the container downwardly through the layers of soil into the plenum, and discharging the air from the plenum back into the room; and
means for selectively introducing air between the upper and lower layers of soil without passing through the upper layer of soil.

26. An indoor air purifier comprising:
an open top container;
at least two layers of soil in the container suitable for supporting growth of aerobic microorganisms; and
means for passing air from a room selectively through one layer of soil and discharging the air back into the room in a first mode of operation;
means for passing air from the room selectively through said at least two layers of soil and discharging the air back into the room in a second mode of operation; and
means for switching between the first and second modes of operation.

27. An indoor air purifier as recited in claim 26 wherein at least an upper layer of soil is also suitable for supporting growth of plants.

28. An indoor air purifier as recited in claim 26 wherein the top surface area of at least an upper layer of soil is in the range of from 0.25 to 1.5 square meters.

29. An indoor air purifier as recited in claim 26 wherein the total thickness of the layers of soil is in the range of from 40 to 100 centimeters.

30. An indoor air purifier as recited in claim 26 comprising a relatively thinner upper layer and a relatively thicker lower layer, and further comprising means for selectively withdrawing air from between the upper and lower layers of soil.

31. An indoor air purifier as recited in claim 26 comprising a relatively thicker upper layer and a relatively thinner lower layer, and further comprising means for selectively introducing air between the upper and lower layers of soil without passing through the upper layers of soil.

32. An indoor air purifier as recited in claim 26 comprising means for passing air through the soil at a sufficient rate that the apparent residence time of the air in the soil is more than about five seconds.

33. An indoor air purifier comprising:
a container having an open top for exposure to air in a room;
a lower layer of soil containing aerobic microorganisms;
an upper layer of soil containing aerobic microorganisms above the lower layer of soil;
an air space between the upper and lower layers of soil;
an air plenum below the lower layer of soil;
means for withdrawing air from the air plenum and discharging the air back into the room in which the air purifier is used;
a bypass duct communicating between the plenum and the air space; and
valve means for selectively permitting or preventing air flow through the bypass duct.

34. An indoor air purifier as recited in claim 33 wherein one of the layers of soil has a thickness in the range of from 5 to 15 centimeters.

35. An indoor air purifier as recited in claim 34 wherein the total thickness of the two layers of soil is at least 40 centimeters.

36. An indoor air purifier as recited in claim 33 wherein the total thickness of the two layers of soil is in the range of from 40 to 100 centimeters.

37. An indoor air purifier as recited in claim 33 further comprising plants growing in the upper layer of soil.

38. An indoor air purifier as recited in claim 33 wherein the upper layer of soil is thinner than the lower layer of soil.

39. An indoor air purifier as recited in claim 33 wherein the upper layer of soil is thicker than the lower layer of soil.

40. An indoor air purifier as recited in claim 33 wherein the upper layer of soil has a different permeability than the lower layer of soil.

41. An indoor air purifier as recited in claim 33 further comprising means for withdrawing liquid from below the lower layer of soil.

42. An indoor air purifier comprising:
a container having an open top for exposure to air in a room;
a lower layer of soil containing aerobic microorganisms;
an upper layer of soil containing aerobic microorganisms above the lower layer of soil;
an air space between the upper and lower layers of soil;
an air plenum below the lower layer of soil;
means for withdrawing air from the air plenum and discharging the air back into the room in which the air purifier is used; and
means for selectively admitting air directly into the air space and bypassing the upper layer of soil.

* * * * *